(12) United States Patent
Kim et al.

(10) Patent No.: US 9,136,977 B2
(45) Date of Patent: Sep. 15, 2015

(54) DATA TRANSMISSION METHOD IN PASSIVE COMMUNICATION SYSTEM

(75) Inventors: Seon Wook Kim, Namyangju-si (KR); Jong-Ok Kim, Seoul (KR); Seok Joong Hwang, Paju-si (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 352 days.

(21) Appl. No.: 13/809,792

(22) PCT Filed: Jan. 24, 2011

(86) PCT No.: PCT/KR2011/000463
§ 371 (c)(1),
(2), (4) Date: Jan. 11, 2013

(87) PCT Pub. No.: WO2012/026656
PCT Pub. Date: Mar. 1, 2012

(65) Prior Publication Data
US 2013/0113611 A1    May 9, 2013

(30) Foreign Application Priority Data
Aug. 27, 2010 (KR) .......................... 10-2010-0083583

(51) Int. Cl.
| | |
|---|---|
| H04L 1/00 | (2006.01) |
| H04W 4/12 | (2009.01) |
| H04B 5/00 | (2006.01) |
| H04L 1/18 | (2006.01) |

(52) U.S. Cl.
CPC ............ *H04L 1/0007* (2013.01); *H04B 5/0031* (2013.01); *H04B 5/0037* (2013.01); *H04L 1/1809* (2013.01); *H04W 4/12* (2013.01)

(58) Field of Classification Search
CPC ...... H04B 5/0031; H04B 5/0037; H04B 4/12; H04L 1/1809
USPC .................................... 340/10.1, 10.3, 10.24
See application file for complete search history.

(56) References Cited

U.S. PATENT DOCUMENTS

| | | | |
|---|---|---|---|
| 6,381,241 B1 * | 4/2002 | Ghirnikar et al. ............. | 370/394 |
| 2007/0035383 A1 * | 2/2007 | Roemerman et al. ........ | 340/10.1 |
| 2007/0296603 A1 * | 12/2007 | Diorio et al. ............. | 340/825.01 |
| 2008/0068135 A1 | 3/2008 | Kung et al. | |
| 2008/0136599 A1 * | 6/2008 | Sugano et al. ............... | 340/10.1 |
| 2009/0028337 A1 * | 1/2009 | Balabine et al. ............. | 380/277 |
| 2009/0115582 A1 * | 5/2009 | Kim ............................. | 340/10.2 |
| 2009/0128294 A1 | 5/2009 | Kim et al. | |

OTHER PUBLICATIONS

International Search Report mailed Sep. 14, 2011 for PCT/KR2011/000463.

* cited by examiner

*Primary Examiner* — Jennifer Mehmood
*Assistant Examiner* — Omar Casillashernandez
(74) *Attorney, Agent, or Firm* — Lowe Hauptman & Ham, LLP (57) ABSTRACT

This invention relates to a data transmission method in a passive communication system being wirelessly powered up and being passively operable, without using its own power, for data transmission and reception, such as in a passive RFID (Radio Frequency IDentification) communication system, which is capable of effectively configuring a message transmitted by a passive device, thereby providing improved transmission efficiency.

5 Claims, 10 Drawing Sheets

FIG.10

DATA TRANSMISSION METHOD IN PASSIVE COMMUNICATION SYSTEM

CROSS-REFERENCE TO RELATED APPLICATION

This application claims the benefit of Korean Application No. 10-2010-0083583, filed on Aug. 27, 2010, with the Korean Intellectual Property Office, the disclosure of which is incorporated herein by reference.

TECHNICAL FIELD

This invention relation relates to a data transmission method in a passive communication system, and more particularly to a data transmission method in a passive communication system being wirelessly powered up and being passively operable, without using its own power, for data transmission and reception, such as in a passive RFID (Radio Frequency IDentification) communication system, which is capable of effectively configuring a message transmitted by a passive device, thereby providing improved transmission efficiency.

BACKGROUND ART

A passive communication system refers to a system including a device being wirelessly powered up and being passively operable, without its own power, for data transmission and reception (hereinafter referred to as a "passive device") and a device which supplies power to the passive device wirelessly for data transmission and reception (hereinafter referred to as an "active device"). A passive RFID (Radio Frequency IDentification) communication system, being representative of a passive communication system, is a system in which a passive device (passive RFID) is attached to a particular physical object and stores data related to the object, such as an identification code and so on, and an active device (a RFID reader) supplies power to the passive device wirelessly and collects information on the object.

In recent years, a passive communication system has been proposed to transmit high-capacity multimedia data as well as low-capacity data such as an identification code at a high speed (see, e.g., J. McDonnell et al, "Memory Spot: Labeling technique", IEEE Pervasive Computing, vol. 9, no. 2, pp. 11-17, April-June 2010.).

However, such a passive communication is disadvantageous in transmitting high-capacity data at a high speed since a passive device has to be operated with a small quantity of power and is unstable in its power supply state due to dependency on power supplied wirelessly, a frequency of a message transmitted by the passive device is unstable due to the limitation in its power supply, and the strength of a signal is so weak to produce a frequent error in message reception.

Thus, in order to avoid such a frequent error in message reception, the passive device limits the length of a message to be transmitted at a time. This is because the passive device has to transmit the message again in the event of an error in message reception and the increase in length of the message results in increase in probability of error in message reception. However, a long message has to be transmitted at a time for the purpose of effective transmission of high-capacity data at a high speed.

Figure 1:
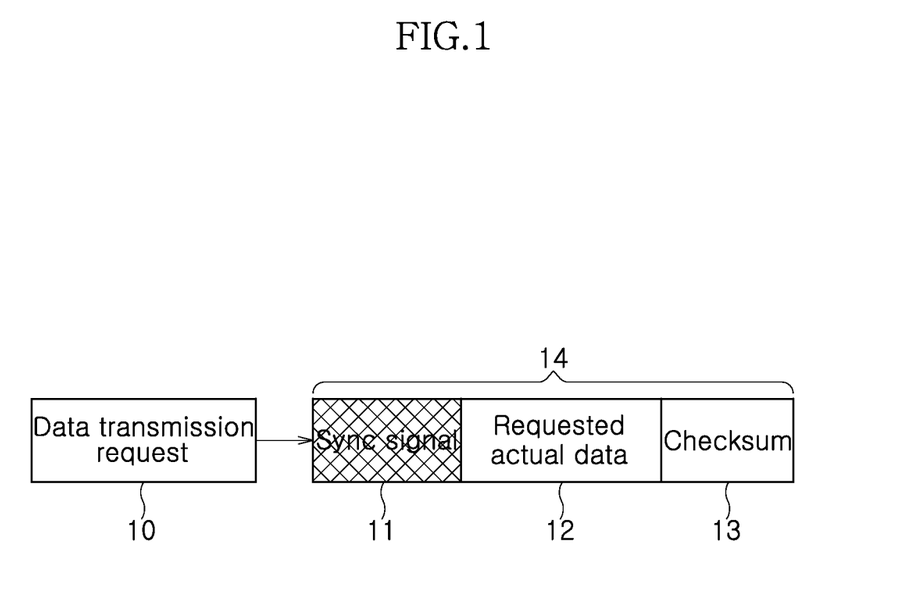
FIG. 1 is a structural diagram of a message in a typical passive communication system.

FIG. 1 shows a structure of a message in a typical passive communication system in which, for a data transmission request 10 from an active device, a passive device transmits a synchronization signal 11, actual data 12 and a checksum 13 used to detect a data transmission error to the active device.

For transmission of one message 14, the passive device consumes time required for actual data transmission, time required for reception of the data transmission request from the active device, and time required for transmission of message elements (a synchronization signal for message synchronization between the active device and the passive device, and a checksum used to determine whether or not data are correctly received) additionally required for actual data transmission.

However, such a passive communication system has a very unstable link frequency and is forced to provide a short message to avoid a high probability of error with the elongation of message. However, this system has a problem of low data transmission efficiency since time required in addition to the time required for the actual data transmission is relatively increased with the short message.

Figure 2:
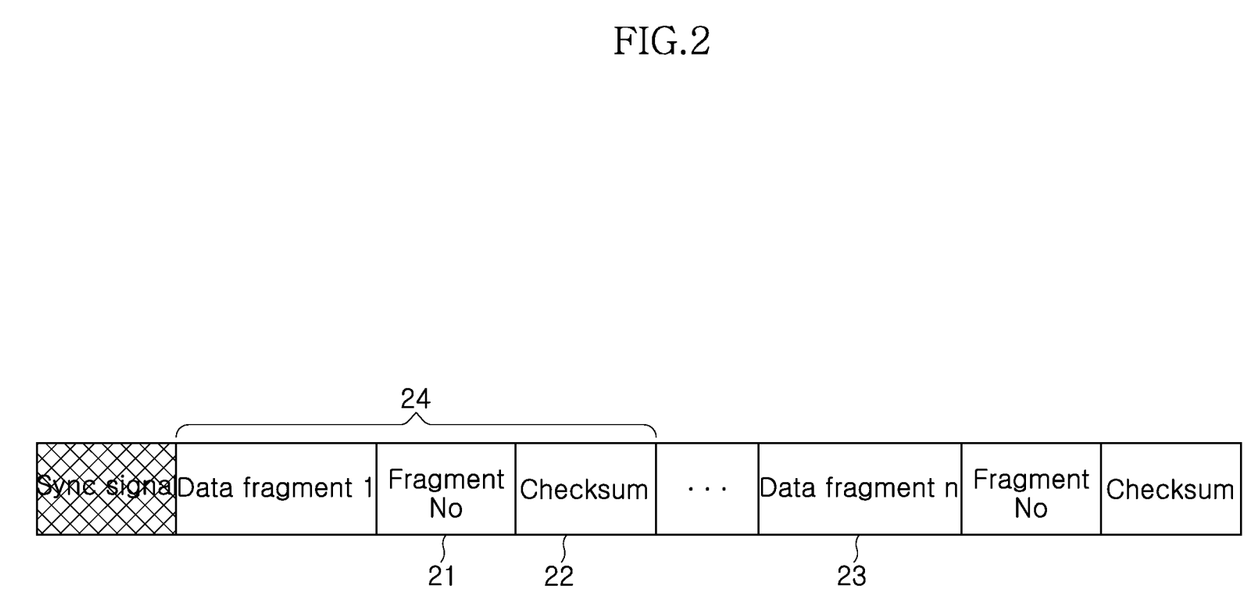
FIG. 2 is a structural diagram of a message in a communication system using a division checksum.

As an attempt to avoid this problem, some active communication system (e.g., R. K. Ganti et al, "Data Streaming in Wireless Sensor Network", Proc. International Conference on Embedded Networked Sensor Systems, 2006, pp. 209-222) use a division checksum method in which one long message is divided into a plurality of message fragments 23 and 24, as shown in FIG. 2, and a number 21 and a checksum 22 for identifying an order of message fragments are inserted for each message fragment. This division checksum method provides high reception efficiency since only message fragments with an error are re-transmitted and received without re-transmission of the whole message even if a reception error occurs in some message fragments.

However, application of such a division checksum method to a passive communication system provides a less effect than an active communication system. Since the passive communication system has very unstable frequency of a message to be transmitted, as opposed to the active communication system, if an active device receives a message having an unstable frequency transmitted by a passive device, synchronization with the message is likely to be lost and messages cannot be correctly received after the point of time when the synchronization is lost.

In this case, even when the message is divided into a plurality of message fragments, message fragments received after the point of time when the synchronization is lost cannot be correctly received at all, which has no contribution to improvement of transmission efficiency.

Figure 3:
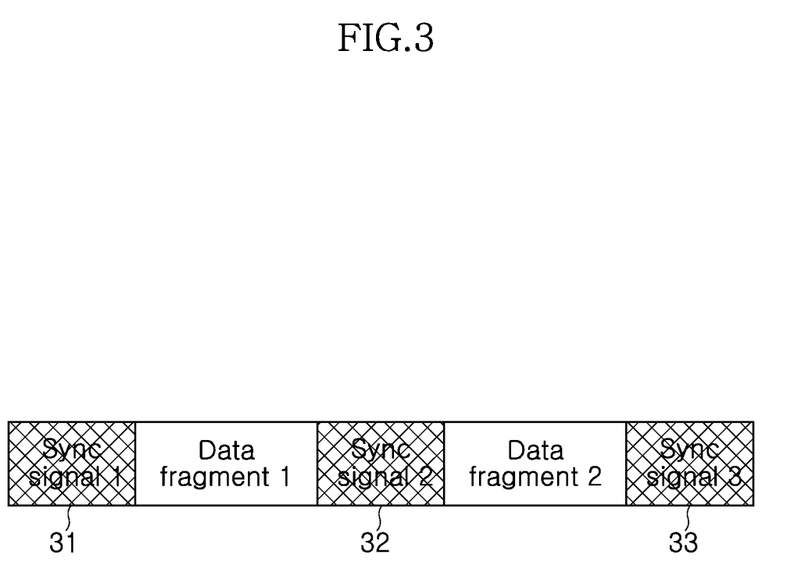
FIG. 3 is a structural diagram of a message using 3 synchronization signals in a passive communication system.

As an attempt to avoid the above problem of unstable frequency in the passive communication system, US Patent Publication 2007/0035383 A1 (titled "Radio Frequency Identification Interrogation Systems and methods of Operating the Same") discloses a method in which 3 synchronization signals are respectively inserted in the beginning, middle and end of a message in passive RFID, as shown in FIG. 3. This method uses several synchronization signals 31, 32 and 33 to alleviate losing of synchronization in message reception.

However, using the fixed number of synchronization signals cannot respond suitably to a variety of communication states. For example, if a passive device transmits a sufficiently strong signal with a correct frequency, transmission of several synchronization signals consumes wasteful time. If a passive device transmits a weak signal with a very unstable frequency, three synchronization signals are insufficient to alleviate losing of synchronization.

In addition, even with alleviation of losing of synchronization, this method has another problem of re-transmission and reception of the whole message in the event of an error in message reception.

DISCLOSURE

Technical Problem

To overcome the above problems, it is an object of the present invention to provide a data transmission method in a passive communication system, which is capable of alleviating loss of synchronization in a passive communication frequency having a low SNR and an incorrect and unstable characteristic by variably setting the number of synchronization signals to allow for optimization of transmission efficiency in consideration of a characteristic of a current link frequency for a transmission message to be transmitted from a passive device to an active device.

It is another object of the present invention to provide a data transmission method in a passive communication system, which is capable of keeping transmission efficiency high by variably setting the length of message fragments or the number of message fragments to allow for optimization of transmission efficiency in consideration of a characteristic of a current link frequency for a transmission message to be transmitted from a passive device to an active device.

It is still another object of the present invention to provide a data transmission method in a passive communication system, which is capable of easily calculating a bit error probability and re-transmitting only message fragments in the even of error reception by inserting identification numbers in message fragments.

It is yet still another object of the present invention to provide a data transmission method in a passive communication system, which is capable of being adaptive to a variety of communication environments through adjustment of the number of synchronization signals, the number of message fragments and the length of message fragments at a request from an active device.

Technical Solution

To achieve the above objects, according to an aspect, the present invention provides a data transmission method in a passive communication system including a passive device having no own power source and an active device which wirelessly supplies power to the passive device and communicates with the passive device, including the steps of: by the active device, transmitting a request message including the number of synchronization signals determined on the basis of communication environmental information; and by the passive device, transmitting a response message to the active device, the response message including a message fragment package including a synchronization signal and one or more message fragment, wherein the message fragment package is constructed by the number of synchronization signals included in the request message of the active device.

Preferably, the active device determines the number of message fragments located between the synchronization signals on the basis of the communication environmental information and includes the determined number of message fragments in the request message.

Preferably, each of the message fragments includes an identification number and a checksum to determine whether or not data are normally received.

Preferably, the data transmission method further includes the step of: when an error occurs in data included in the message fragments received by the active device, by the active device, recording the error to correspond to the message fragment using the identification number of each of the message fragments.

Preferably, the data transmission method further includes the steps of: by the active device, in the even of the error, transmitting a re-transmission request message including a bit flag corresponding to the identification number of the message fragment to the passive device; and by the passive device, constructing only data for a message fragment corresponding to the bit flag in conformance to a structure of the response message and transmitting the constructed data to the active device.

Preferably, the data transmission method further includes the steps of: by the active device, collecting error statistics for message fragments having the same distance from the synchronization signals using the error record; by the active device, obtaining an offset of a bit error probability using the error statistics depending on the size of corresponding ones of the message fragments having the same distance; and obtaining a slope of the bit error probability depending on the number of message fragments between the synchronization signals.

Preferably, the data transmission method further includes the step of: by the active device, obtaining a set, {message fragment size, synchronization signal interval, the number of synchronization signals}, to allow the response message structure to be optimal to communication environments using the offset and slope of the bit error probability, and request the passive device to apply this set.

Preferably, the data transmission method further includes the step of: by the active device, initializing the error record after the response message structure is changed.

Preferably, the data transmission method further includes the step of: by the active device, acquiring synchronization by detecting the synchronization signals from the response message received by the active device, and decoding data of the response message.

Preferably, the passive device is a passive RFID.

Advantageous Effects

According to the embodiments of the present invention, the data transmission method in a passive communication system has an advantage of increase in transmission efficiency by alleviating loss of synchronization in a passive communication frequency having a low SNR and an incorrect and unstable characteristic by variably setting the number of synchronization signals to allow for optimization of transmission efficiency in consideration of a characteristic of a current link frequency for a transmission message to be transmitted from a passive device to an active device.

The data transmission method in a passive communication system has another advantage of stable transmission of mass data such as multimedia stream data by a passive device by keeping transmission efficiency high by variably setting the length of message fragments or the number of message fragments to allow for optimization of transmission efficiency in consideration of a characteristic of a current link frequency for a transmission message to be transmitted from a passive device to an active device.

The data transmission method in a passive communication system has another advantage of prevention of overload by easily calculating a bit error probability and re-transmitting only message fragments in the even of error reception by inserting identification numbers in message fragments.

The data transmission method in a passive communication system has a further advantage of high adaptability for communication environments by being adaptive to a variety of communication environments through adjustment of the number of synchronization signals, the number of message fragments and the length of message fragments at a request from an active device.

MODE FOR INVENTION

Hereinafter, preferred embodiments of the present invention will be described in detail with reference to the accompanying drawings.

In a passive communication system including a passive device and an active device, the passive device has no own power source and, thus, an uplink transmission frequency thereof has a low signal-to-noise ratio (SNR) and is unstable and incorrect as it is varied.

Accordingly, such a passive communication system often employs a protocol configured to accept a frequency variation of about 2.5% and a normal frequency error of about 22%, as opposed to an active communication system. An example of such a passive communication protocol includes a protocol between a passive RFID tag and an RFID reader.

The present invention provides a data transmission method for maximizing transmission efficiency by avoiding a problem of bit error probability and synchronization loss which may occur due to a low SNR and an unstable and incorrect link frequency in passive communications.

Figure 4:
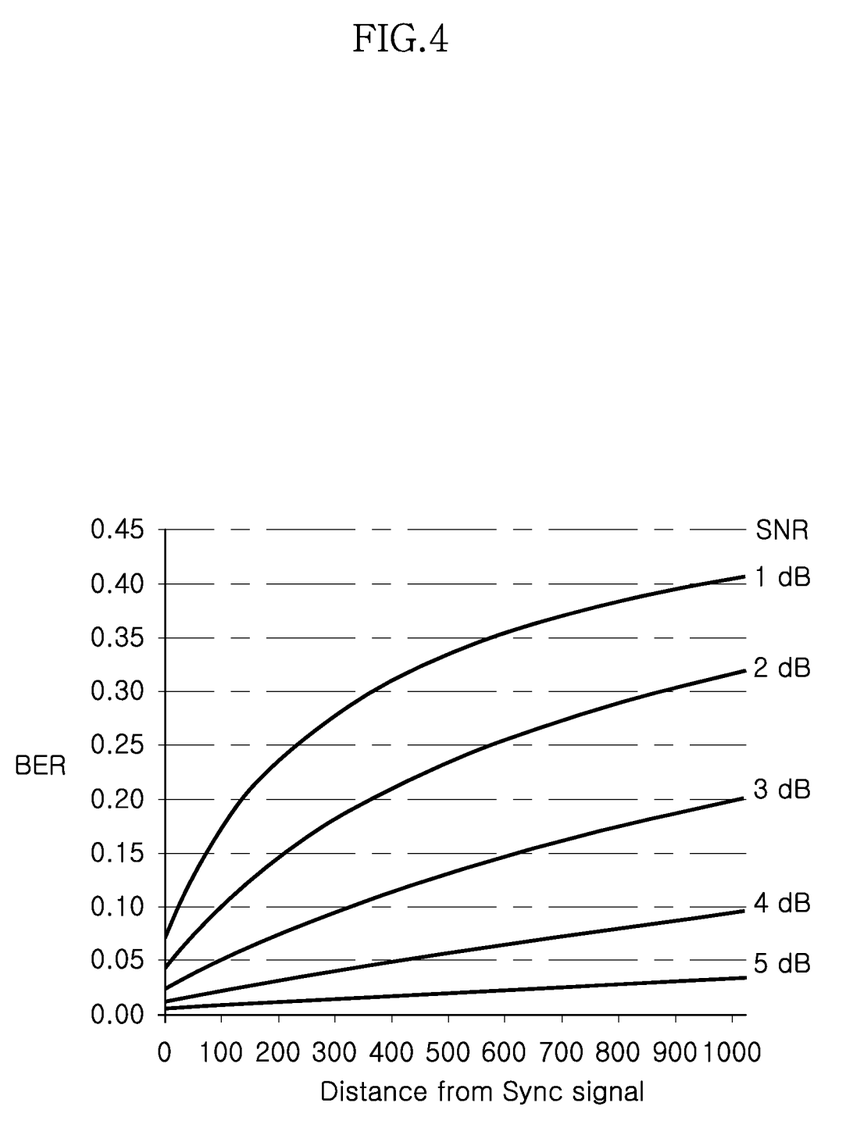
FIG. 4 is a view showing a bit error rate of individual bits depending on a distance from a synchronization signal at a link frequency of low SNR.

FIG. 4 is a view showing a bit error rate (BER) of individual bits depending on a distance from a synchronization signal at a link frequency of low SNR. FIG. 4 shows a correlation between BER and a bit distance from a synchronization signal at a link frequency of a low SNR falling within a range of 1 dB to 5 dB.

As used herein, the link frequency is a correct frequency with no consideration of an error and frequency variation and the BER is monotonically increased as the distance from the synchronization signal is increased. Although the link frequency has no variation and is correct, the BER curve shown is not completely flat, which may be attributed to decoding affected by signal noise and may be more serious for a frequency having a wider range of variation.

The BER may be expressed by the following Equation 1.

$$BER(D) = 1 - \alpha \times \beta^D \qquad [\text{Eq. 1}]$$

Where, D is a bit distance from a synchronization signal, $\alpha$ is a symbol decoding probability in an adequate timing window, and $\beta$ is a probability of a decoding timing offset in the adequate timing window.

According to the definition of $\beta$ in Eq. 1, $\beta^D$ corresponds to a synchronization success probability at a D-th bit.

Figure 5:
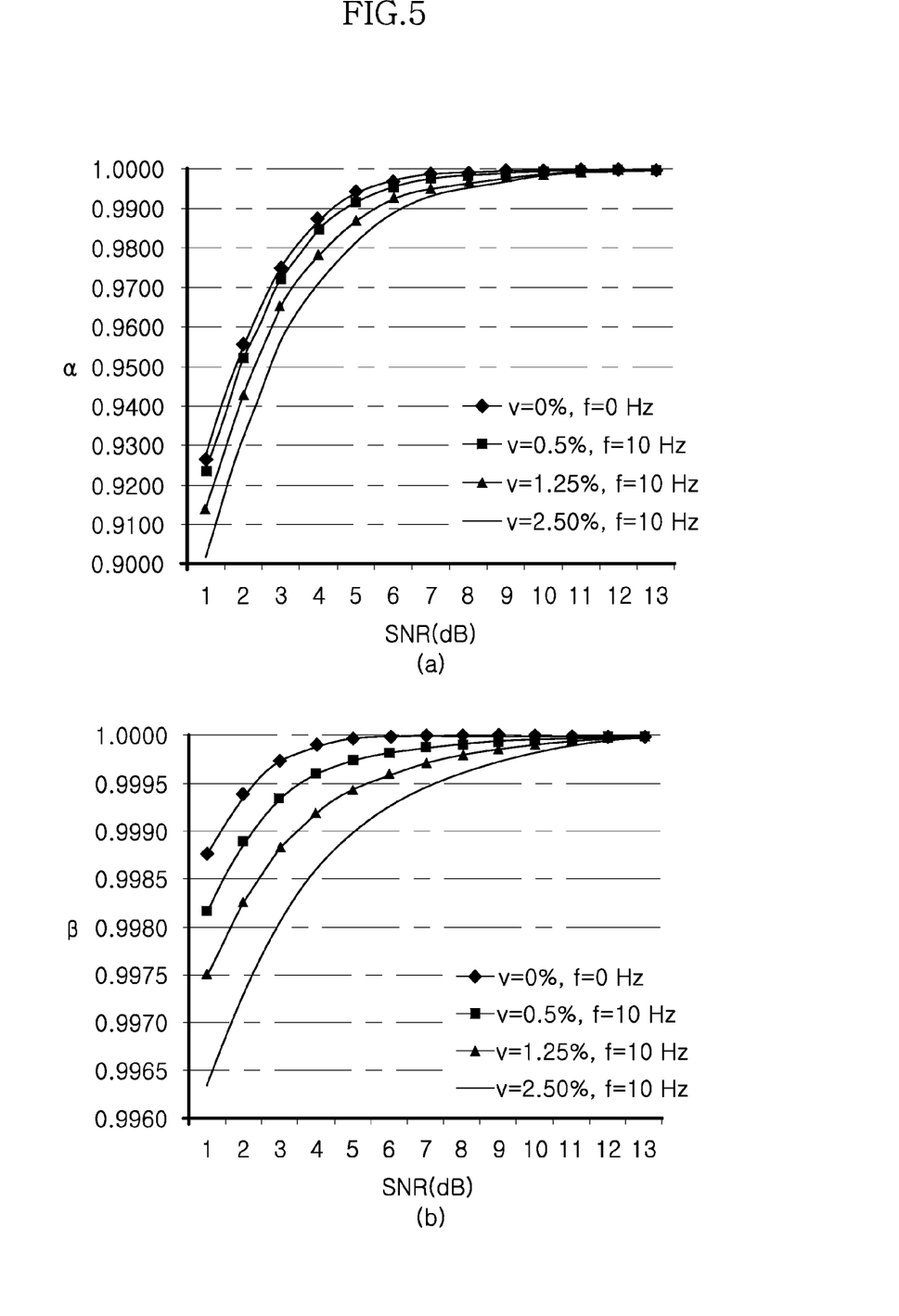
FIG. 5 is a view showing a characteristic depending on SNR of a link frequency in consideration of a variation in an uplink.

FIG. 5 shows $\alpha$ and $\beta$ depending on SNR of a link frequency in consideration of a variation in an uplink condition (i.e., signal transmission from a passive device to an active device). As shown, $\alpha$ is sensitive to change in SNR but less sensitive to variation in the link frequency, as shown in FIG. 5a, whereas $\beta$ appears to be very sensitive to variation in the link frequency (i.e., greatly decreased as the variation in the link frequency of a low SNR is increased), as shown in FIG. 5b.

This bit error characteristic reveals that a message fragment located after a message fragment having a particularly small $\beta$ (i.e., having a higher synchronization loss probability) in the division checksum method shown in FIG. 2 may have a higher BER than those of the previous message fragments.

Accordingly, the synchronization loss has to be effectively controlled since $\beta$ is inherently very small on the characteristic that the passive communication system has unstable variation in the link frequency.

Therefore, in the data transmission method in the passive communication system, synchronization signals are inserted between fragments of a message a the division checksum scheme in order to eliminate a synchronization loss probability continuously increasing between message fragments in data transmission (uplink) from a passive device to an active device.

In this manner, the transmission efficiency can be increased since loss of synchronization in a passive communication frequency having a low SNR and an incorrect and unstable characteristic can be alleviated by variably setting the number of synchronization signals to allow for optimization of transmission efficiency in consideration of a characteristic of a current link frequency for a transmission message to be transmitted from a passive device to an active device.

That is, the synchronization signals inserted in the transmission message is operated at a re-synchronization point to lower a synchronization loss probability of message fragments affected by a distance from a synchronization signal.

At this time, the transmission efficiency (TP) of the uplink in the passive communication system may be expressed by the following equation 2.

$$TP = \frac{L \times I \times N \times (1 - \rho(R_{max} + 1))}{T_{ACK} + T_{RESP} + T_{RETRY}} \qquad [\text{Eq. 2}]$$

Where, the numerator in Eq. 2 represents the amount of data to be transmitted and the denominator represents time consumed for the whole message to be successfully transmitted.

The transmission efficiency includes three important parameters:

L: Bit unit length of each message fragment

I: The number of message fragments between synchronization signals (i.e., an insertion interval of synchronization signals expressed by the message fragment unit)

N: The total number of synchronization signals included in a transmission message In addition, in Eq. 2, ρ(r): Probability of reception failure of message fragments for r attempts $R_{max}$: Limit on the number of reattempts $T_{ACK}$: Transmission request time of ACK command $T_{RESP}$: Response time of acknowledgement message $T_{RETRY}$: Re-transmission time.

The above parameters may result in an expression including α, β, L, I and N except several preset constants, details of which will be omitted.

That is, parameters except L, I and N in Eq. 2 representing the transmission efficiency are expressed by an equation including L, I and N under the characteristic of a given link frequency (the characteristic of α and β to determine the symbol decoding performance and the synchronization performance). Accordingly, parameters of the optimized message structure to maximize the transmission efficiency in the data transmission method in the passive communication system according to the present invention are expressed by the following equation 3.

$$\{L^*, I^*, N^*\} = _{L,I,N}{}^{max} TP \qquad [\text{Eq. 3}]$$

Figure 10:
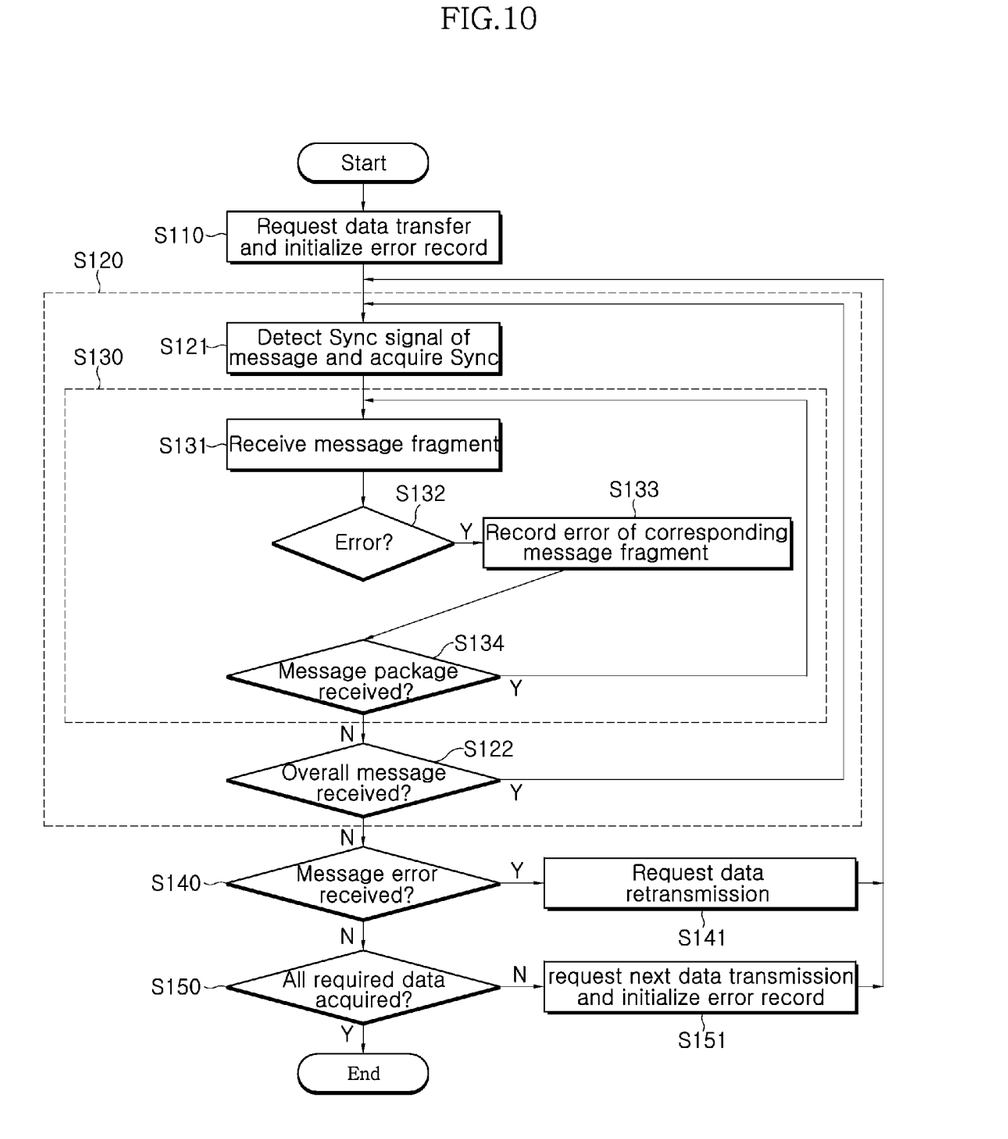
FIG. 10 is a flow chart of a data transmission method according to one embodiment of the present invention.

Accordingly, in the data transmission method in the passive communication system according to the present invention, the optimized transmission message structure to maximize the transmission efficiency can be determined by examining the characteristic of the current link frequency determined by α and β using the number of message fragments received by an active device from a passive device, the number of message fragments having an error, and a distance from a synchronization signal, estimating SNR and frequency variations based on the examined characteristic, and adjusting L, I and N to meet the corresponding frequency characteristic, details of which will be described later with reference to FIG. 10.

In conclusion, the data transmission method according to the present invention has the ability to overcome both of the problem of individual bit errors and the problem of loss of synchronization, both of which frequently occur in a passive communication system due to low SNR and unstable frequency quality.

Figure 6:
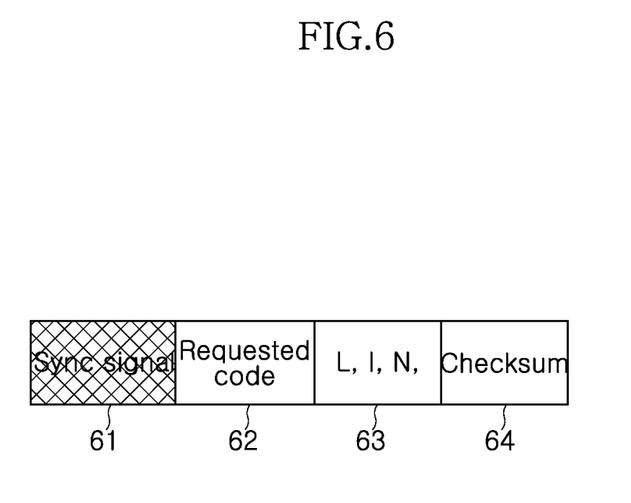
FIG. 6 is a structural diagram of a request message to request change in a configuration of a response message according to one embodiment of the present invention.

FIG. 6 is a structural diagram of a request message to request change in a configuration of a response message according to one embodiment of the present invention, in which the request message is sent by an active device to a passive device.

As shown, the request message from the active device includes a synchronization signal 61, a request code 62, a checksum 64 and three factors (L, I and N) 63. L represents the data length of each of one or more message fragments into which a message transmitted by the passive device is divided, I represents the number of message fragments between synchronization signals, that is, a distance between synchronization signals, and N represents the number of synchronization.

Accordingly, one message transmitted by the passive device include data of the length corresponding to L*I*N, I*N message fragments and N synchronization signals. If the number of message fragments is one, no identification may be attached to the message fragment.

Figure 7:
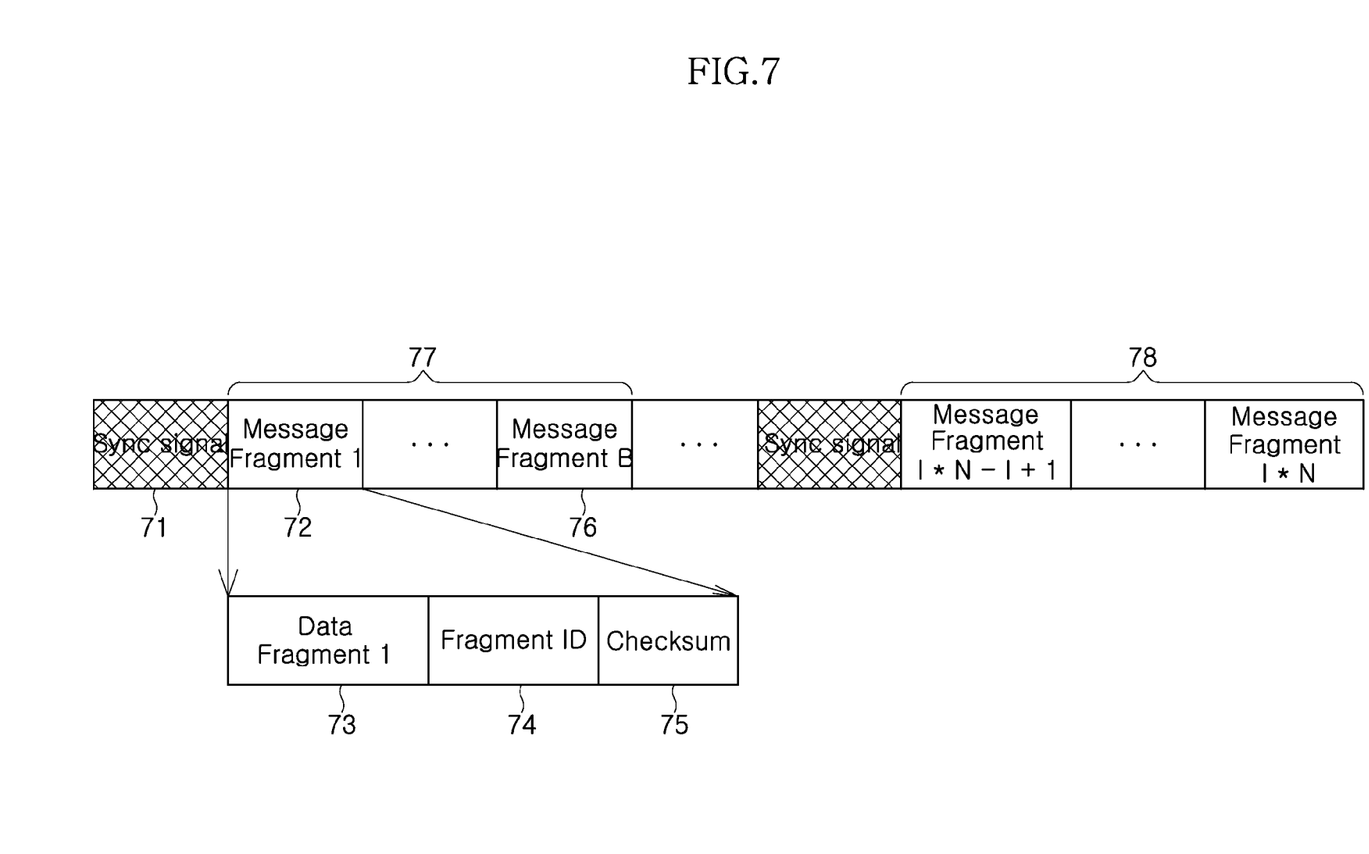
FIG. 7 is a structural diagram of a response message transmitted by a passive device according to one embodiment of the present invention.

FIG. 7 is a structural diagram of a response message transmitted by a passive device according to one embodiment of the present invention. As shown, the structure of the response message includes one or more synchronization signals 71 which are variably configured depending on the characteristic of a link frequency, and one or more message fragments 72 and 76 between the synchronization signals 71. Each of the message fragments 72 and 76 includes an actual data fragment 73, a message fragment ID 74 to allow identification of the message fragments, and a checksum 75 to check a data error. In the above structure, the length of actual data fragment L, the number of message fragments I (77 and 78) between the synchronization signals, and the number of synchronization signals may be changed at a request from the active device.

Figure 8:
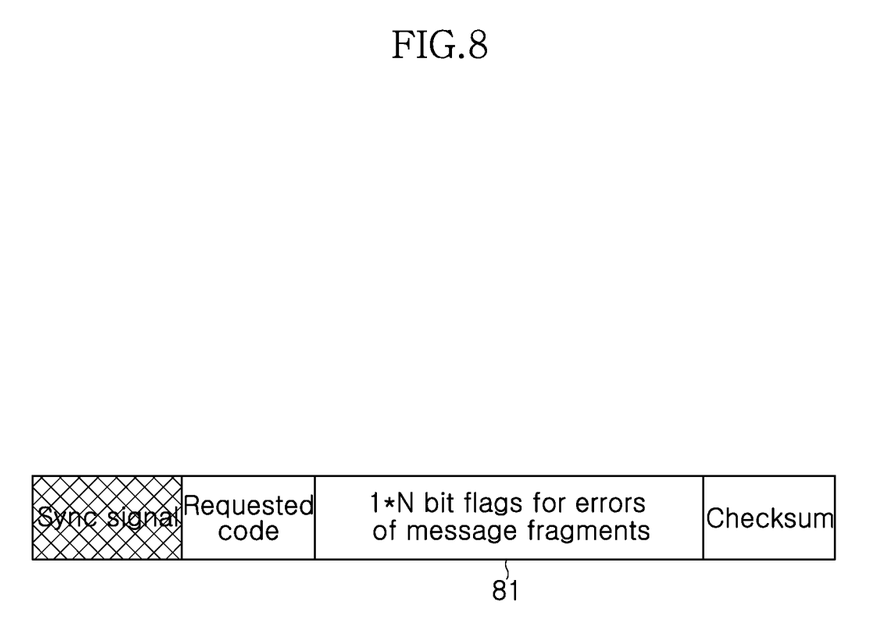
FIG. 8 is a structural diagram of a re-transmission request message transmitted by an active device according to one embodiment of the present invention.

FIG. 8 is a structural diagram of a re-transmission request message transmitted by an active device according to one embodiment of the present invention. Referring to this figure, if a data reception error occurs in a message, the active device transmits a re-transmission request message as shown in the figure. The re-transmission request message includes I*N bit flags 81 indicating whether or not an error occurs in received message fragments. The passive device which received the re-transmission request message re-transmits only corresponding message fragments.

Figure 9:
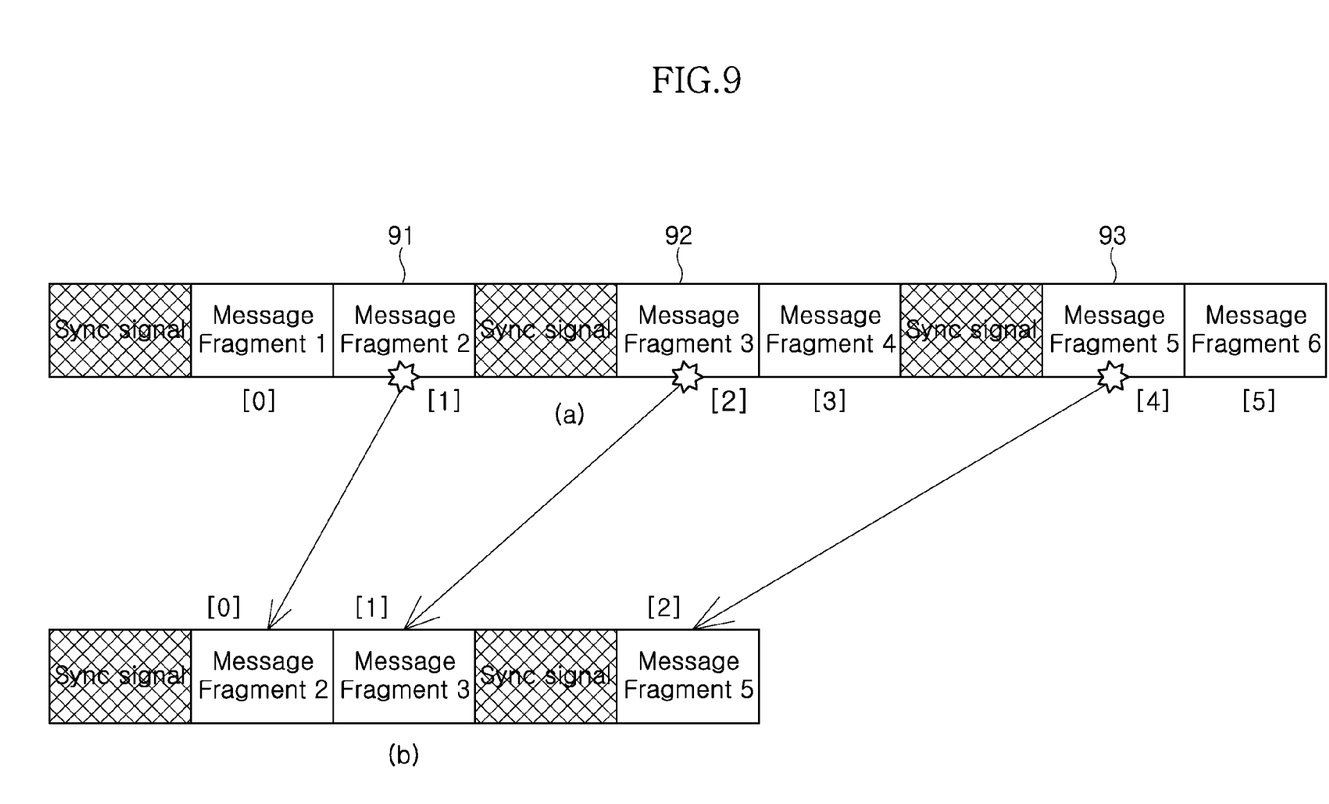
FIG. 9 is a structural diagram of a re-transmission response message transmitted by a passive device according to one embodiment of the present invention.

FIG. 9 is a structural diagram of a re-transmission response message transmitted by a passive device according to one embodiment of the present invention. This figure shows a structure (FIG. 9b) of a response message to the active device by the passive device which received the re-transmission request message (FIG. 9a) from the active device. Upon receiving the re-transmission request message, the passive device transmits only message fragments 91, 92 and 93 corresponding to the bit flags to the active device in conformance with the format of the response message.

FIG. 10 is a flow chart of a data transmission method according to one embodiment of the present invention. This flow chart shows a method in which the passive device and the active device use the message structure described in FIGS. 6 to 9 to divide data into a plurality of messages to be continuously transmitted.

First, the active device (for example, an RFID reader) sends a data transmission request to the passive device (for example, a passive RFID) (S110). The data transmission request (S110) includes factors use to control the transmission message structure of the passive device, as shown in FIG. 6, that is, the length of actual data fragments L, the number of message fragments L between synchronization signals, and the number of synchronization signals N. At this time, a record on the presence of an error of message fragments to be received begins with initialization. The record is used for a re-transmission request in the event of a message reception error.

That is, when the active device transmits a request message including the number of synchronization signals determined depending on information on communication environments, the passive device transmits a response message to the active device, the response message being configured by a number of message fragment packages, each configured by a synchronization signal and one or more message fragments, which corresponds to the number of synchronization signals included in the request message of the active device.

In this manner, since high transmission efficiency can be achieved by variably setting the length of message fragments or the number of message fragments between the synchronization signals for optimization of the transmission efficiency in consideration of the characteristic of the current link frequency, the passive device can perform stable transmission of mass data such as multimedia stream data.

In addition, each of the message fragments includes an ID and a checksum used to determine whether or not data are normally received.

A procedure (S120) for receiving one response message has a nested loop structure. The active device acquires synchronization by detecting synchronization signals in order to receive I*N message fragments divided by N synchronization signals (S121) and receives I message fragments (S131).

That is, the active device detects the synchronization signals from the received response message, acquires the synchronization based on the detected synchronization signals, and decodes data of the response message.

In addition, one message fragment is repeatedly received (S130) in order to receive I message fragments in Step S120. A record on the presence of a reception error of message fragments is made (S132 and S133) and is used to generate I*N bit flags as shown in FIG. 8 for data re-transmission request (S141). In the data re-transmission request (S141), the active device transmits a re-transmission request message to the passive device, the re-transmission request including bit flags corresponding to IDs of the message fragments in the event of a reception error. In response, the passive device configures only data for the message fragments corresponding to the bit flags in conformance with the above-described message structure and transmits the data to the active device.

In this manner, a probability of bit error can be easily calculated by transmitting the IDs inserted in the message fragments in the data re-transmission step (S141) and an Overload can be prevented by re-transmitting only the corresponding message fragments in the event of a reception error.

When reception of one response message is completed without error (S140), transmission of the next data is requested if necessary (S150 and S151), in case of which an error occurrence trend and the like are analyzed and the length of actual data fragments L, the number of message fragments I between synchronization signals and the number of synchronization signals N are changed in compliance with the current communication environments based on the analysis (S151).

In some embodiments, the statistics of reception errors of message fragments may be used to change the length of actual data fragments L, the number of message fragments I between synchronization signals and the number of synchronization signals N in compliance with the current communication environments. Step S151 includes collecting statistics and changing the length of actual data fragments L, the number of message fragments I between synchronization signals and the number of synchronization signals N.

The collection of statistics of errors is performed in the message fragment reception step (S130) and the error recording step (S133). In the error recording step (S133), if an error occurs in data included in message fragments of the response message received by the active device, the active device uses IDs of the message fragments to record errors to correspond to the message fragments.

Arrangements may be set and collected for such recording of errors. For example, two arrangements (FERC[0:I−1] and FRXC[0:I−1]), each having I entries, may be set and collected. Each of the entries of the two arrangements collects statistics of errors of message fragments having particular sequence numbers in the message (see FIG. 9).

A relationship between the message fragment sequence numbers and the corresponding arrangement entry number is "(message fragment sequence number in a message) mod(I)". This is used to collect statistics of message fragments having the same distance from a synchronization signal located right in front of the corresponding one of the message fragments and is because a distance between a message fragment and a synchronization is a factor important in determining the error trend of message fragments. That is, a receiver has the increased probability of loss of synchronization with increased distance of a message fragment from a synchronization signal, which result in an increased probability of reception error.

Whenever a message fragment is received in the message fragment reception step S130, an entry value of the FRXC arrangement corresponding to the message fragment is incremented by one. In addition, whenever an error occurs in the message fragment reception in the error recording step S133, an entry value of the corresponding FERC arrangement is incremented by one.

The error statistics collected in the steps S130 and S133 are used to adjust the length of actual data fragments L, the number of message fragments I between synchronization signals and the number of synchronization signals N. At this time, only when the total sum of the FERC arrangements exceeds a predetermined value, the length of actual data fragments L, the number of message fragments I between synchronization signals and the number of synchronization signals N are adjusted only when sufficient error statistics are collected (S151). First, a temporal arrangement BER[0:B−1] indicating a bit error probability of message fragment having a specific distance from a synchronization signal is generated. A bit error probability of a message fragment whose length is L may be obtained using a lookup table or may be calculated according to an equation, $1-(1-FERC[n]/FRXC[n])^{(1/L)}$.

As mentioned previously, a receiver (or an active device) has the increased probability of loss of synchronization with increased distance of a message fragment from a synchronization signal, which result in an increased probability of reception error. A degree of probability of reception error is determined by quality (variation or the like) of a frequency of a response message transmitted by a passive device and quality (SNR or the like) of a received response message. At this time, a curve covering a range from BER[0] to BER[I−1] is determined. Accordingly, this statistics curve is modeled and factors of this model are used to determine the length of actual data fragments L, the number of message fragments I between synchronization signals and the number of synchronization signals N, which are optimal to the current communication environments.

As a preferred embodiment of determining the optimal length of actual data fragments L, number of message fragments I between synchronization signals and number of synchronization signals N, when the statistics curve is modeled as a linear graph, a slope and an offset of the statistics curve may be used. On an experimental basis or by calculation, the optimal length of actual data fragments L, number of message fragments I between synchronization signals and number of synchronization signals N for a particular slope and offset may be pre-stored in a table and determined by referring to this table (for example, {L, I, N}=Table[Slope][Offset]). Once the optimized length of actual data fragments L, number of message fragments I between synchronization signals and number of synchronization signals N are determined, the arrangements are removed and new arrangements are generated and initialized based on the number of message fragments I of new synchronization signals.

That is, the active device uses the error record to collect the error statistics for message fragments having the same distance from the synchronization signal, uses the error statistics to obtain an offset of the bit error probability depending on size of corresponding ones of the message fragments having the same distance, and obtains a slope of the bit error probability depending on the number of message fragments between synchronization signals. Thereafter, the active device uses the offset and slope of the bit error probability to obtain a set, {message fragment size, synchronization signal interval, the number of synchronization signals}, to allow the message structure to be optimal to the communication environments, and request the passive device to apply this set.

After the structure of the response message is changed, the active device initializes the error record (S151).

Thus, the data transmission method in the passive communication system according to the embodiment of the present invention can properly cope with and be highly adaptive to a variety of communication environments by adjusting the number of synchronization signals, the number of message fragments and the length of message fragments at a request from an active device.

While the present invention has been particularly shown and described with reference to exemplary embodiments thereof, it will be understood by those skilled in the art that various changes in form and details may be made therein without departing from the spirit and scope of the present invention as defined by the appended claims and equivalents thereof.

What is claimed is:

1. A data transmission method in a passive communication system including a passive device having no own power source and an active device which wirelessly supplies power to the passive device and communicates with the passive device, the method comprising the steps of:
  a) by the active device, determining a number of synchronization signals and a number of message fragments located between the synchronization signals on the basis of communication environmental information, and transmitting a request message including the number of synchronization signals and the number of message fragments;
  b) by the passive device, transmitting a response message to the active device, the response message including a message fragment package including a synchronization signal and one or more message fragments, wherein the message fragment package is constructed by the number of synchronization signals included in the request message of the active device, and each of the message fragments includes an identification number and a checksum to determine whether data are normally received or not;
  c) when an error occurs in data included in the message fragments received by the active device, by the active device, recording the error to correspond to the received message fragments using the identification number of each of the message fragments;
  d) by the active device, in the event of the error, transmitting a re-transmission request message including a bit flag corresponding to the identification number of the message fragment to the passive device;
  e) by the passive device, constructing only data for a message fragment corresponding to the bit flag in conformance to a structure of the response message and transmitting the constructed data to the active device;
  f) by the active device, collecting error statistics for message fragments having the same distance from the synchronization signals using the error record;
  g) by the active device, obtaining an offset of a bit error probability using the error statistics depending on the size of corresponding ones of the message fragments having the same distance; and
  h) by the active device, obtaining a slope of the bit error probability depending on the number of message fragments between the synchronization signals.

2. The data transmission method according to claim 1, further comprising the step of:
  i) by the active device, obtaining a set of message fragment size, synchronization signal interval and the number of synchronization signals to allow a structure of the response message to be optimal to communication environments using the offset and slope of the bit error probability, and requesting the passive device to apply the set to the structure of the response message.

3. The data transmission method according to claim 2, further comprising the step of: after the step i),
  j) by the active device, initializing the error record when the structure of response message is changed.

4. The data transmission method according to claim 3, further comprising the step of:
  k) by the active device, acquiring message synchronization by detecting the synchronization signals from the response message received by the active device, and decoding data of the response message.

5. The data transmission method according to claim 1, wherein the passive device is a passive Radio Frequency Identification (RFID).

* * * * *